United States Patent [19]
Ugolini

[11] Patent Number: 5,713,214
[45] Date of Patent: Feb. 3, 1998

[54] LEVEL CONTROL MACHINE FOR PRODUCING AND DISPENSING COOLED BEVERAGES OR WATER-ICE

[75] Inventor: Giancarlo Ugolini, Milan, Italy

[73] Assignee: Ugolini S.P.A., Italy

[21] Appl. No.: 651,436

[22] Filed: May 22, 1996

[30] Foreign Application Priority Data

Jul. 19, 1995 [IT] Italy .................................. MI95A1558

[51] Int. Cl.[6] .................................................. F25D 17/02
[52] U.S. Cl. ............................. 62/188; 137/392; 141/198
[58] Field of Search ........................... 62/188; 137/392; 340/620; 73/304 R; 141/95, 198

[56] References Cited

U.S. PATENT DOCUMENTS

| | | | |
|---|---|---|---|
| 413,976 | 2/1889 | Pohrer et al. | 137/392 |
| 3,179,920 | 4/1965 | McGinty | 73/304 R |
| 3,437,107 | 4/1969 | Waseleski, Jr. | 137/392 |
| 4,390,793 | 6/1983 | John | 137/392 |
| 4,547,768 | 10/1985 | Kulhavy | 340/620 |
| 5,529,751 | 6/1996 | Chandler et al. | 73/304 R |

*Primary Examiner*—William E. Tapolcai
*Attorney, Agent, or Firm*—Shlesinger Fitzsimmons Shlesinger

[57] ABSTRACT

A machine for cooling and dispensing a product substantially behaving like a fluid, such as beverages or water-ice, comprises a base (11) and a tank (12) for treatment of the product to be dispensed. The tank is positioned on the base in a removable manner and heat exchange means (14) and a powered stirring element (15) are inserted thereinto. Also arranged in the tank (12) is a level probe (19) connected with control means (25) of the product level in the tank. The probe (19) has one detecting end (20) within the tank and an electrical-contact area (23) disposed on an external wall of the tank (12). Additionally, the base (11) bears an electrical-contact element (24) connected to the control means (25). On mounting of the tank (12) on the base (11), the contact area (23) of the probe (19) comes into electrical contact with the contact element (24) on the base so that the probe (19) is automatically connected in a detachable manner to the control means (25). Further means (43) disables a filling-up action controlled by the level sensor, in case of lack or improper positioning of the sensor and/or the tank.

21 Claims, 2 Drawing Sheets

LEVEL CONTROL MACHINE FOR PRODUCING AND DISPENSING COOLED BEVERAGES OR WATER-ICE

BACKGROUND OF THE INVENTION

Well-known in the art are machines usually employed in bars and ice-cream shops or parlours for producing and dispensing a product substantially behaving like a fluid, such as cooled beverages and water-ice.

Generally these machines are comprised of a transparent tank in which a heat-exchange element and a rotating stirrer are inserted. The tank is provided with a dispensing cock from which, upon command, the beverage or water-ice in a semiliquid or pasty state is drawn.

Also proposed are machines in which a level sensor is present which controls admission of a new amount of liquid mixture into the tank, so as to prevent the cooled or iced product from being used up and therefore avoid long and non-productive waiting times necessary to bring to temperature an entire new load of product.

In the known art the level sensor is usually made in the form of a mere conductive rod, hanging from the tank edge so as to be dipped in the liquid until a given limit which is judged as the minimum acceptable one. A movable electric cable connects the rod to an electronic device detecting the dipping condition of the rod by the electrical conduction taking place through the product in the tank. When the rod is not wetted by the liquid, the electronic device causes operation of a solenoid valve or a pump for admission of new product. In these machines of the known art there is an inconvenience in that the sensor needs to be dismantled from the tank every time the tank has to be removed from the machine for periodical cleaning operations, and in addition it is necessary to remember that the sensor needs to be placed to the right position again on every reassembling of the tank.

Furthermore, the movable cable connecting the sensor to the level-adjusting device is aesthetically unpleasant and can be accidentally torn away very easily. Forgetting to arrange the sensor in place again or, even worse, an accidental pull to the cable or falling of the detector have dreadful effects since the control device interprets the lack of signal by the sensor as an indication of an insufficient level which, as a result, will involve a continous filling up until overflowing of the liquid from the tank.

It is a general object of the invention to obviate the above mentioned drawbacks by providing a machine for producing and dispensing cooled beverages and water-ice in which the level sensor does not need to be manually removed or disconnected every time the tank is moved and subsequently reinstalled or reconnected on positioning back of the tank, while at the same time avoiding the presence of inconvenient and unaesthetic movable electric wires.

It is a further object of the invention to provide a safety element against an inopportune filling up, if the level sensor is lacking.

SUMMARY OF THE INVENTION

In view of the above objects, in accordance with the invention a machine for cooling and dispensing a product substantially behaving like a fluid, such as beverages or water-ice, has been devised which comprises a base and a tank for treatment of the product to be dispensed, the tank being positioned in a removable manner on the base and having heat exchange means and a powered stirring element inserted therein, a level probe being in addition located within the tank, which probe is connected to level-control means for the product held in the tank, characterized in that the probe has one detecting end within the tank and an electrical-contact area disposed on an external wall of said tank, the base carrying an electrical-contact element connected to the control means, on positioning of the tank onto the base the probe contact area coming into electrical contact with the contact element on the base so as to authomatically connect the probe to the control means in a detachable manner.

BRIEF DESCRIPTION OF THE DRAWINGS

For better explaining the innovatory principles of the present invention and the advantages it offers over the known art, a possible embodiment of the invention practising said innovatory principles will be taken hereinafter by way of non-limiting example, with the aid of the accompanying drawings, in which.

DETAILED DESCRIPTION OF THE INVENTION

Figure 1:
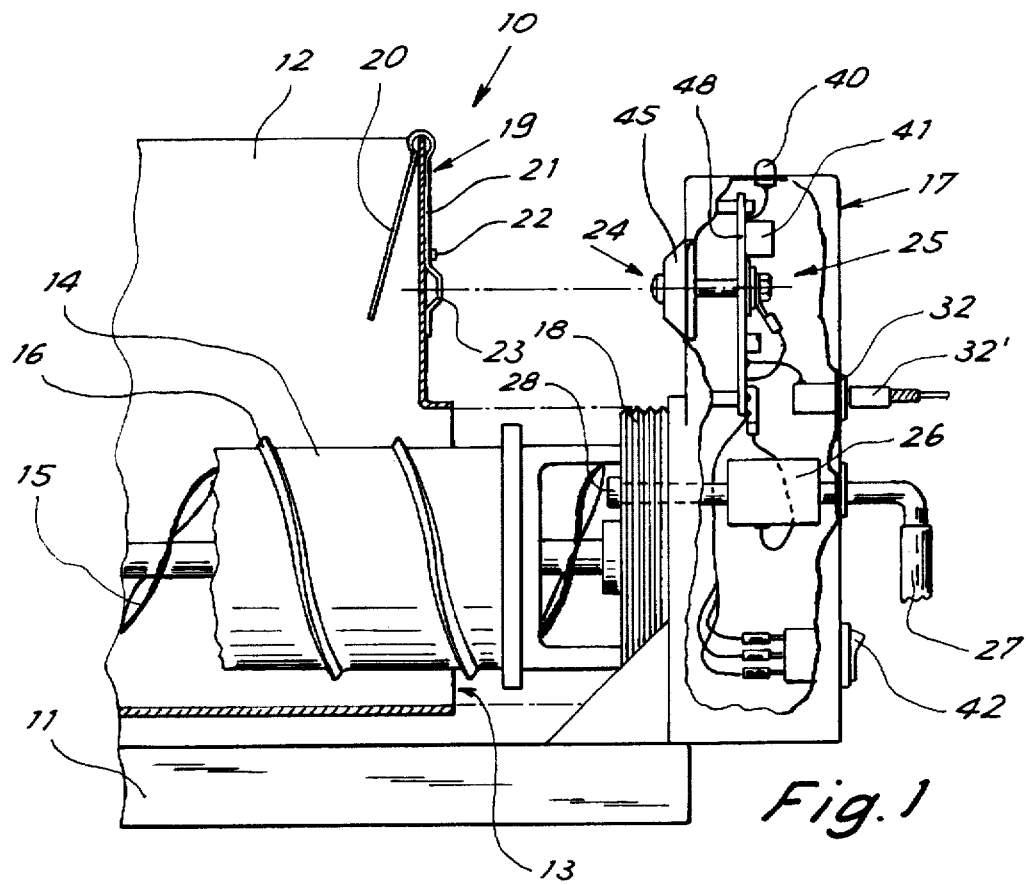
FIG. 1 is a fragmentary exploded diagrammatic view, partly in section, of a machine in accordance with the invention.

With reference to the drawings, part of the machine for producing and dispensing cooled beverages or water-ice (the remaining part of said machine being easily conceivable by a person of ordinary skill in the art) is diagrammatically shown in FIG. 1 and generally identified by reference numeral 10.

The machine 10 comprises a body or base 11 onto which an open-top detachable tank 12 is received. The tank 12 has an opening or mouth 13 at one end into which a heat exchanger 14 of a refrigerating circuit (not shown) and a powered stirrer 15 are inserted. Advantageously, the heat exchanger is of a hollow cylindrical form inside which the stirrer 15 is axially received. A fixed helix 16 may be present on the external periphery of the cylinder in order to increase the mixing action exerted on the product in the tank.

Both the exchanger and stirrer project horizontally from a shoulder 17 standing up from the base 11. The shoulder also carries a sealing collar 18 conveniently located so as to seal the opening 13 on pressure-mounting of the tank against the shoulder.

The machine so far described is of a type substantially known and therefore it will not be further described or illustrated.

In particular, at the tank end opposite to the mouth 13 a traditional dispensing cock is present for dispensing the product, while the tank may also be provided with a top cover.

Then, devices for regulating and controlling operation of the machine will be also provided the function of which will be that of maintaining the product held in the tank at a given temperature and possibly a predetermined consistency.

According to the innovatory principles as herein claimed, the tank carries a sensing element or probe 19 of a conductive material, conveniently in the form of a "V" to be placed astride the upper edge of the tank, of which a detecting arm 20 is disposed inside the tank and a contact arm 21 is situated along the external tank wall. The free end of the detecting arm in the tank is at a height which is judged as the minimum one that the product can reach before filling up becomes necessary.

As will be clarified in the following, the probe is of the conductive type, that is it detects the presence of the product by the electric conductivity of the product itself.

The probe is made to advantage in the form of an elastic metal foil, so that it can grasp at the upper edge of the tank. In view of offering a precise positioning reference and a steady anchoring, the external probe arm 21 is provided with a hole so that it can be hooked to a reference element or pin 22 projecting from the external tank wall. In this manner, the probe 19 can be easily located in place and removed, if necessary, by a mere snap movement.

The external arm 21 has a conveniently shaped contact area 23 so that it moves away from the external wall of the tank, and the shoulder 17 extends upwardly over the mouth 13 in order to support an electrical contact element 24 at the contact area 23 of the probe 19.

As better clarified in the following, the contact element 24 is connected to an electronic circuit 25 arranged to advantage within the shoulder itself and causing operation of filling-up means 26, a solenoid valve or a pump for example, having an inlet duct 27 to which the filling-up liquid comes and an outlet duct 28 for admission into the tank.

Therefore, connection between the probe and the electronic circuit takes place by electrical pressure-contact between the area 23 and contact 24 every time the tank is arranged in place, its opening 13 being fitted on the sealing collar Therefore, no particular operations are required when the tank is to be removed or set in place again.

Figure 2:
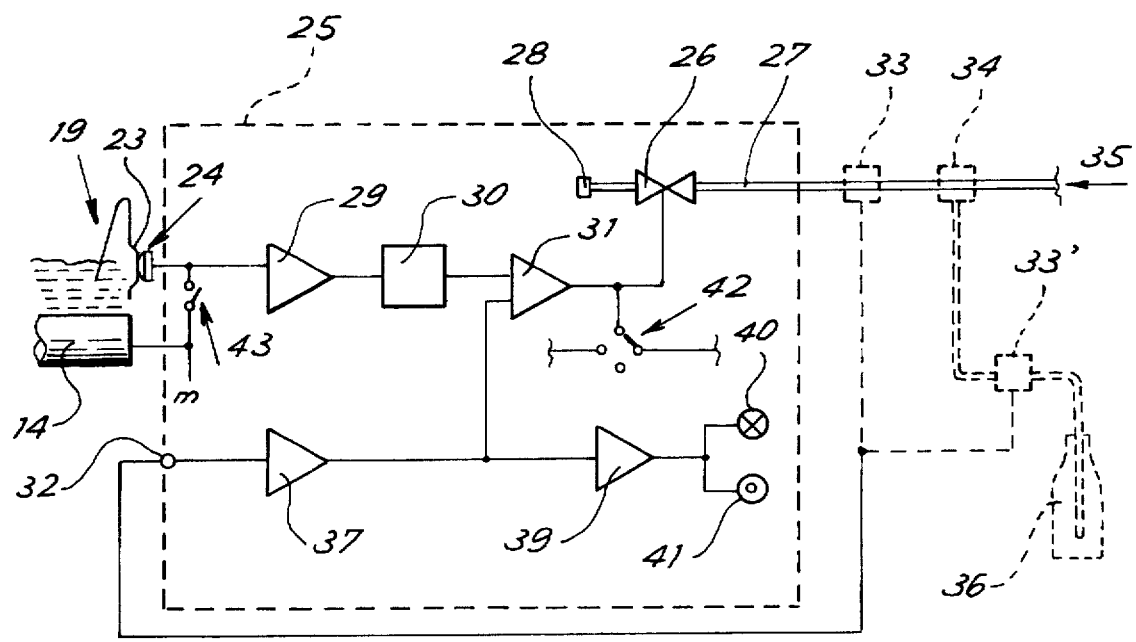
FIG. 2 represents a block diagram of a level-sensor device present in the machine shown in FIG. 1.

Shown in FIG. 2 is a block diagram of the level-control circuit in accordance with the invention, comprising a detector 29 for detecting when the probe 19 is wetted by the product in the tank. To do so, the detector detects when a passage of electric current between the probe 19 and another metallic reference element in contact with the product in the tank occurs. For example, this other metal element may be to advantage the exchanger 14 usually earthed, made of a metallic material and closely in contact with the product in the tank.

Obviously, the electric current running through the sensor is maintained to values non dangerous for the human body. In other words, under normal conditions the probe 19 is earthed through the product contained in the tank. The inclination of the detecting arm 20 of the probe for moving the free end thereof away from the inner tank wall prevents the moisture present on the inner wall from establishing a conductive path between the probe and the earth when the product level in the tank is low. The detector output 29 is connected to a delay circuit 30, the output of which is connected with an amplifier 31 causing activation of the filling-up means 26. When the detector 29 stops detecting the current passage, it sends a signal to the delay circuit which, if the signal lasts longer than the delay time previously set therein (about ten seconds, for example), emits an activation signal for the filling-up means 26 through the amplifier 31. The activation delay is provided for the purpose of avoiding activations due to a temporary uncovering of the probe as a result of the mixing movement by the stirrer.

When the probe is again wetted by the product the detector stops emitting the activation signal and the filling-up means is turned off.

According to the innovatory principles of the invention, in order to inhibit activation of the filling-up means when the probe is not present or, even worse, when the tank has been removed, switching means 43 is provided, operation of which is caused by the absence of the tank or the probe, for connecting the contact 24 directly to the earth. Under these conditions, the detector 29 will detect a current passage in the same manner as in the case in which a probe wetted by the liquid is present.

An advantageous embodiment of the switching means in accordance with the invention is now described.

The liquid reaching the inlet 27 generally is an appropriate mixture of water and syrup. This mixture can be previously prepared and stored in a container (not shown) from which it is sent to the inlet of duct 27, or it can be obtained by automatically mixing water and syrup upon request of the filling-up means 26.

In the last mentioned case, which is advantageous due to a greater independence of the machine, a known mixing device 34 is provided which mixes the water coming from a source 35 (a usual water supply, for example) with the syrup coming from a source 36 consisting of a syrup container for example, to be filled up or replaced when empty. In the case in which the liquid is pressure-pushed from the source (in the case in which containers under pressure are concerned or the liquid is coming from a water supply, for example), the filling-up means 26 can be a solenoid valve.

Should that not be the case, the filling-up means 26 can consist of a suction pump.

The mixing device 34 itself can be a metering and sucking pump for the liquids.

Advantageously, the circuit 25 comprises another input 32 to which a presence sensor 33 is connected for ascertaining the presence of at least one of the components of the filling-up liquid upstream of the filling-up means 26. If a water source and a previously mixed syrup are used, the sensor can be located at the mouthpiece of duct 27. In the case of a continous water source and a separate discrete syrup source, the sensor can be located on a duct feeding the syrup to the mixer, as shown at 33' in FIG. 2, so that it may detect the syrup exhaustion.

The input 32 terminates at a detector 37 the output of which is connected to an amplifier 39 causing operation of optical and acoustic signalling means, 40 and 41 respectively. When detector 37 detects a lack of liquid by means of a sensor 33 (of the conductive type or of another known type easily imaginable by a person of ordinary skill in the art, a float-sensor for example), it emits a signal of lack of liquid activating, through the amplifier 39, the signalling means 40, 41 in the form of a light-emitting diode (LED) or a piezo-electric buzzer, for example.

The signal of lack of liquid is also sent to a disabling input of the amplifier 31 to disable activation of the filling-up means irrespective of the detection carried out by the probe 19.

In this manner, when the filling-up liquid is exhausted, the operator is warned and he can carry out replacement of the corresponding container, for example. In the case of admission of liquid produced by mixing a syrup with water directly drawn from the water supply, disabling of the filling-up means prevents the tank from being filled up with water alone, when the syrup container is empty. If the sensor 33 for detecting the presence of the filling-up liquid is not contained in the machine itself, the input 32 can be embodied by a socket 32 provided on the shoulder 17 to which the sensor 33 is connected through a movable electric cable and a plug 32', as shown in FIG. 1.

For triggering suction of the filling-up liquid when the machine is first started or after replacement of a filling-up liquid container, a switch 42 is provided for manual operation of the filling-up means 26. For example, the switch 42 too can be located on the shoulder 17, and it may comprise two stable positions, for turning the filling-up device off and for the automatic normal operation of same respectively, and one momentary position controlled by a push-button, for direct operation of the filling-up means.

Figure 3:
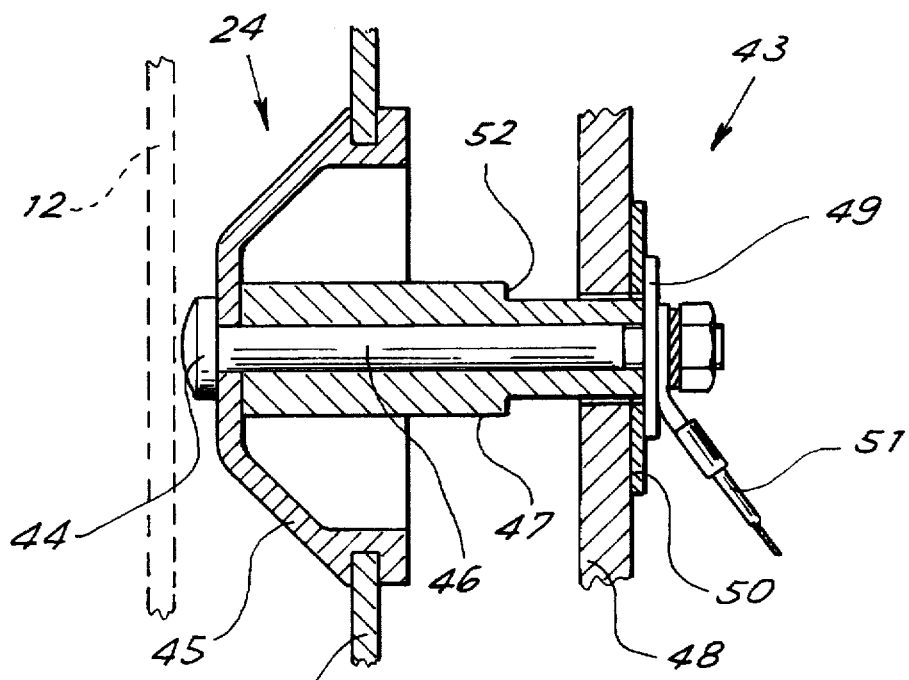
FIGS. 3 and 4 are diagrammatic sectional views of a detail intended for electrical coupling and control of the presence of the level sensor, the sensor being absent and present, respectively.
Figure 4:
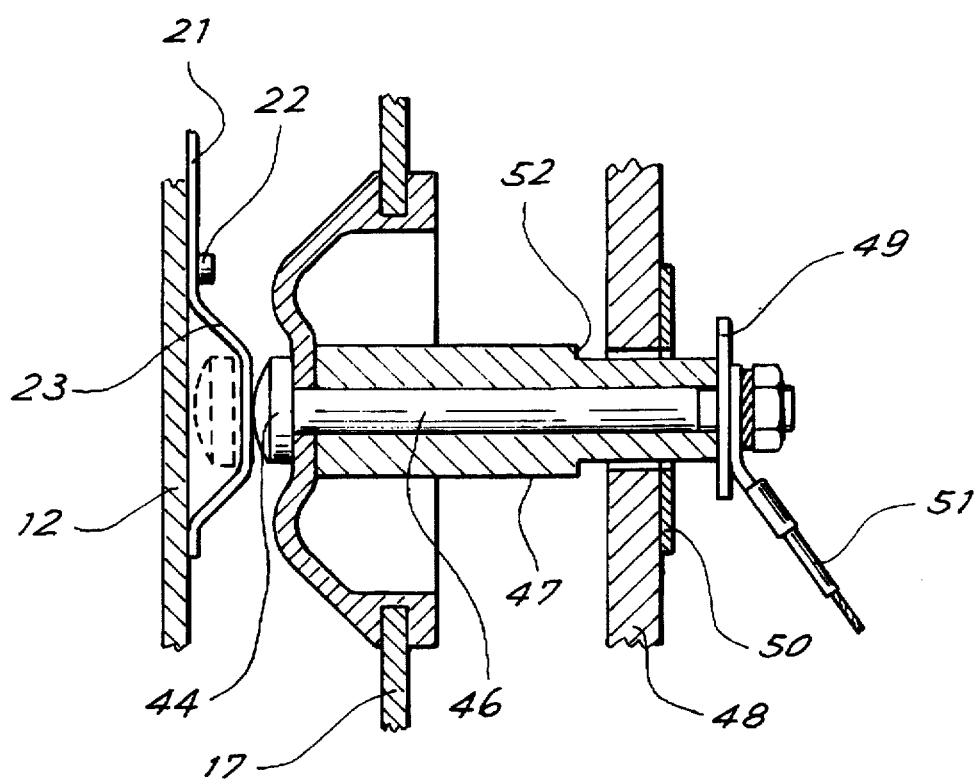

Shown in FIGS. 3 and 4 is an advantageous embodiment of the switching means 43. In this solution the contact element 24 comprises a movable electrical contact 44, intended for bearing against the contact area 23 of the probe 19. Contact 44 is supported in the middle by an elastic cup 45 made of rubber, in turn fitted on a hole passing through the shoulder 17 wall facing the tank. Formed in the extension of contact 44, backwardly of the cup 45, is a conductor shank 46 surrounded by an insulating sleeve 47. The shank insulated by the sleeve passes through a printed circuit board 48, fastened to the shoulder, on which an electronic circuit 25 is advantageously installed. The free end of the shank 46 terminates, on the opposite side of the board 48, with a conductive radial washer 49, electrically connected to the shank.

In the rest condition, the cup 45 pulls the shank to the outside, so that the washer 49 rests on a conductive track 50 of the board surrounding the hole for passage of the shank through the board itself. Electrically connected to the shank is a conductor 51 in turn connected to the detector 29 input.

The track 50 is instead connected to the exchanger 14 ground.

In the rest condition, shown in FIG. 3, the contact 44 is therefore connected to the ground, which corresponds to the closure of the switch 43 shown in FIG. 2. Therefore, the level-detecting circuit is disabled, the probe being jumped over by the direct connection of the contact 44 to the ground.

On the contrary, a sufficient thrust on the contact 44, against the action of the elastic means represented by the cup 45, causes deformation of the cup 45 and moves the washer 49 apart from the track 50, which corresponds to the opening of the switch 43 in FIG. 2. Thus enabling of the level-detecting circuit occurs. The sleeve 47 can have a radial step 52 forming an end of stroke against the board 48 to avoid an excessive deformation of the elastic cup.

Under rest conditions, the contact 44 projection is not sufficient for causing the tank to interfere with the contact itself to such a degree that the washer 49 is moved away from the track 50, as shown in chain line in FIG. 3.

The projection of the contact area 23 of the probe from the tank wall is, on the contrary, sufficient for both bringing the probe contact area 23 into electrical contact with the movable contact 44, and pushing the contact 44 until the washer 49 is moved away from the track 50, as shown in FIG. 4.

It is therefore apparent that only the presence of the tank with the probe mounted in a correct manner enables operation of the level sensor, thereby avoiding any problem of inconvenient operation of the filling-up means due to the absence of the sensor or the tank.

For the machine use, it is sufficient to mount the tank on the machine with the sensor in place and operate the switch 42, for activating the filling-up means until triggering of the automatic filling-up process takes place (that is, until the sensor 33 for detecting the presence of the filling-up liquid is reached by the liquid and therefore enables the automatic operation of the filling-up device).

The automatic filling up will go on automatically until the liquid in the tank reaches the probe end 20. At this point the device 25 stops the liquid admission. Every time drawing liquid from the tank causes the liquid level to fall to such a height that the probe is completely uncovered, the filling-up device will begin operating for restoring the appropriate level.

When sensor 33 detects exhaustion of the filling-up liquid or the syrup, the automatic filling up will be stopped and lighting of the signalling means will warn the operator of the necessity of refilling.

At this point it is apparent that the intended purposes have been achieved. In a machine made in accordance with the invention any additional operation following dismantling or reassembling of the tank is no longer necessary, and in addition said machine offers an intrinsic operating safety.

Furthermore, since the filling-up device is completely held in the shoulder, it leaves the aesthetic appearance of the machine substantially unchanged as compared with known machines and avoids the presence of additional devices being positioned around the machine.

Obviously, the above description of an embodiment applying the innovatory principles of the invention is given for purposes of illustration only and therefore must not be considered as a limitation of the scope of the invention as herein claimed.

For example, the shape of the different parts may vary depending on the particular requirements. The level probe can be embodied in other forms; it may be a pin sealingly passing through the tank wall for example, or be of a non conductive type. In addition, the circuit described as a block diagram can be made following different known technologies as it can be easily understood by those of ordinary skill in the art.

Based on the above information, a technician will be able to design practical embodiments of the circuit shown in FIG. 2, with ease.

In addition, the switching means for disabling the level detection when the tank or the probe is missing can also be made separately from the contact means, by providing a separate switch operated by the presence of the tank or probe, for example.

Finally, further elastic means such as springs for example may be provided for pushing the contact 44 to its rest position.

What is claimed is:

1. A machine for cooling and dispensing a product substantially behaving like a fluid, such as beverages or water-ice, comprising a base and a tank for treatment of the product to be dispensed, the tank being positioned in a removable manner on the base and having heat exchange means and a powered stirring element inserted therein, a level probe being in addition located within the tank, which probe is connected to level-control means for the product held in the tank, characterized in that the probe has one detecting end within the tank and an electrical-contact area disposed on an external wall of said tank, the base carrying an electrical-contact element connected to the control means, on positioning of the tank onto the base the probe contact area coming into electrical contact with the contact element on the base, so as to automatically connect the probe to the control means in a detachable manner.

2. A machine according to claim 1, characterized in that the probe is of a conductive type and, at a level condition of the product higher than a predetermined minimum level, an electrical detection current runs through the product in contact with the probe so as to reach a metallic reference element which is also in contact with the product in the tank.

3. A machine according to claim 2, characterized in that the metallic reference element comprises heat exchange means.

4. A machine according to claim 2, characterized in that the probe is made of a metallic foil generally bent in the form of an inverted "V" so that it can be placed astride an upper edge of the tank, a first arm of said "V" forming the detecting end in the tank and a second arm being disposed along the external tank wall and identifying the contact area.

5. A machine according to claim 4, characterized in that the foil is elastic for grasping at the tank edge.

6. A machine according to claim 5, characterized in that the tank comprises a locator for positioning and anchoring of the probe.

7. A machine according to claim 6, characterized in that the locator comprises a pin projecting from the external tank wall for fitting in a seating formed in the second arm of the foil.

8. A machine according to claim 4, characterized in that the first arm is inclined so that it is spaced apart from the inner tank wall.

9. A machine according to claim 1, characterized in that it comprises automatic means for disabling of the control means in the absence of the tank and/or the probe.

10. A machine according to claim 9, characterized in that the disabling means comprises a switch for connection of the contact element with the reference element.

11. A machine according to claim 10, characterized in that the connecting switch is formed of a portion integral with and electrically connected to the contact element, the contact element being made movable against the action of spring means for being pushed by the probe contact area so that, on the correct positioning of the tank and the related probe on the base, it causes said integral portion to be moved away from the electrical connection with a contact connected to the reference element.

12. A machine according to claim 11, characterized in that the contact element is carried by a cup which is made of elastically yielding material and embodies said spring means.

13. A machine according to claim 12, characterized in that the contact element extends backwardly of said cup with a shank embodying said integral portion.

14. A machine according to claim 13, characterized in that the shank passes through a board supporting a conductive track embodying said contact connected to the reference element, on pushing of the contact element inwardly of the cup a free end of the shank moving away from the electrical contact with the conductive track.

15. A machine according to claim 1, characterized in that the contact element is positioned on a shoulder projecting vertically from the base for holding up the stirrer and exchange means so that they can be sealingly fitted in a side opening of the tank, the mutual-contact direction between the probe contact area and contact element being parallel to the fitting direction of the stirrer and exchange means in the side opening of the tank.

16. A machine according to claim 1, characterized in that the control means comprises a detector detecting a non-contact condition of the probe with the product, the detector emitting an activation signal enabling filling-up, towards filling-up means.

17. A machine according to claim 16, characterized in that interposed between the detector and the filling-up means is delay means enabling passage of the activation-enabling signal when said signal lasts longer than a predetermined period of time.

18. A machine according to claim 16, characterized in that the control means comprises a sensor sensing the absence of at least one liquid component for filling-up of the product in the tank, the sensor emitting an operation-disabling signal for the filling-up means in the absence of said liquid.

19. A machine according to claim 18, characterized in that on emitting of the disabling signal, the sensor causes activation of signalling means.

20. A machine according to claim 19, characterized in that the signalling means comprises optical and acoustic signallers.

21. A machine according to claim 18, characterized in that the control means comprises a switch for manual turning on of the filling-up means independently of said disabling signal.

* * * * *